United States Patent [19]

McKewan

[11] 4,266,590
[45] May 12, 1981

[54] PREVAILING TORQUE NUT

[75] Inventor: Arthur J. McKewan, Rochester, Mich.

[73] Assignee: Microdot Inc., Darien, Conn.

[21] Appl. No.: 28,328

[22] Filed: Apr. 9, 1979

[51] Int. Cl.³ .............................................. F16B 39/02
[52] U.S. Cl. ..................................... 411/307; 411/311
[58] Field of Search ...................... 151/22, 21 B, 14 R; 85/46, 47, 48, 32 T

[56] References Cited

U.S. PATENT DOCUMENTS

| 1,075,310 | 10/1913 | Ulrich | 151/22 |
| 1,416,087 | 5/1922 | Woodward | 151/21 B |
| 1,798,604 | 3/1931 | Hoke | 151/14 R |
| 2,788,046 | 4/1957 | Rosan | 151/22 |
| 2,870,668 | 1/1959 | Flahaut | 151/21 B X |
| 4,076,064 | 2/1978 | Holmes | 151/22 X |
| 4,150,702 | 4/1979 | Holmes | 85/46 X |
| 4,171,012 | 10/1979 | Holmes | 85/46 X |

Primary Examiner—J. Franklin Foss
Attorney, Agent, or Firm—Harness, Dickey & Pierce

[57] ABSTRACT

A threaded fastener assembly comprises a bolt with standard 30° flank V-threads and a nut with 30° flank V-threads modified to have wedge ramps between adjacent top and bottom flanks and characterized by the uniform pitch of the nut threads being a predetermined amount less than the uniform pitch of the bolt threads so that there is flank to flank contact between the engaging nut and bolt threads a the top of the nut and the bottom of the nut.

6 Claims, 2 Drawing Figures

PREVAILING TORQUE NUT

BRIEF SUMMARY OF THE INVENTION

The invention relates to fasteners using internal thread forms of the wedge ramp type such as set forth in U.S. Pat. No. 4,076,064. It is the purpose of this invention to increase the effectiveness of this thread form and this is accomplished by using it in combination with an external thread that has a slightly greater thread pitch.

DETAILED DESCRIPTION OF THE INVENTION

Figure 1:
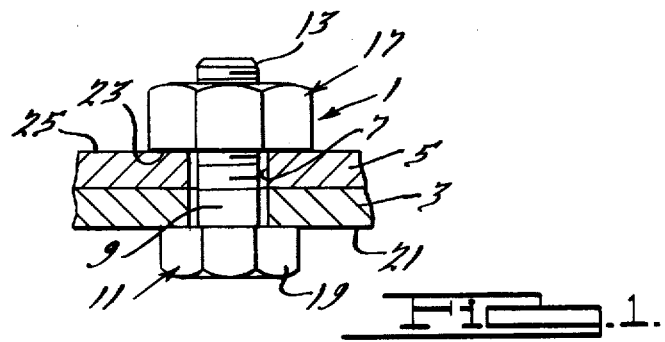
FIG. 1 is a side elevation of a fastener assembly utilizing the invention.

The fastener assembly 1 of the drawings is used to clamp plates 3 and 5 together. These plates have aligned holes 7 through which the shank 9 of a bolt 11 extends so that external threads 13 on the shank can thread into and mate with internal threads 15 in a hex nut 17. The bolt has a hex head 19 with an undersurface bearing against a side 21 of plate 3 and the nut has a bottom bearing surface 23 bearing against side 25 of plate 5. When the fastener 1 is tightened by application of torque, the nut 17 will move toward the head 19 to exert a clamping force on plates 3 and 5.

The bolt 11 and its threads 13 are preferably of a standard design available on the open market. A preferred form is shown in which helical, uniform pitch V-threads 3 have 30° top and bottom straight flanks 27 and 29, respectively, meeting in a crest 31 at the outer diameter of the threads. Likewise, the nut has helical, uniform pitch, modified standard V-threads 15 with 30° top and bottom straight flanks 33 and 35, respectively, which are interconnected at their roots or outer diameters by wedge ramps 37 that preferably extend normally to the adjacent top flanks 33. The diameter of bolt thread crests (and tolerances thereof) is selected so that it is less than the maximum diameter of wedge ramps 37 and more than their minimum diameter (and tolerances thereof). Thus, the crests 31 will or will not engage the ramps 37 depending upon the spacing between the flanks of the internal and external threads, i.e., the relative axial positions of the bolt and nut. In cases where the bolt and nut threads have the same pitch, there will be some looseness when the two are threaded together but as torque is applied the respective top flanks separate and the tip of the crest contacts the ramp. Further application of torque causes the crest to ride down the ramp, i.e., toward a lesser diameter, this being accommodated by bending of the crests. This inhibits or prevents relative transverse movement between the internal and external threads and therefore resists loosening due to vibratory or alternating loads.

Figure 2:
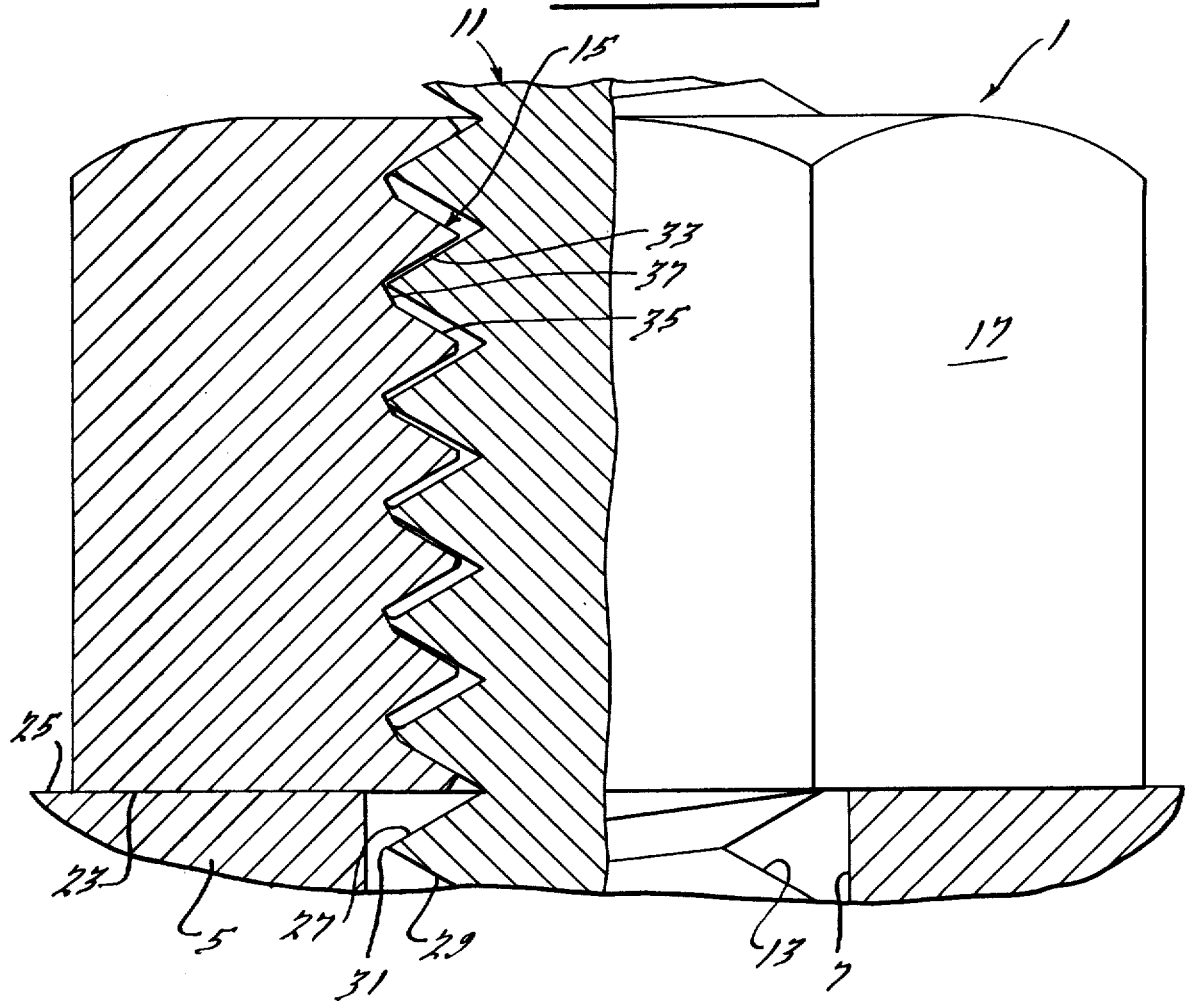
FIG. 2 is an enlarged broken away cross section of a part of the assembly of FIG. 1 showing the structure of a preferred form of the invention.

In accordance with the present invention the pitch of the internal threads 15 is finer than that of the external threads 13, the latter preferably being a standard pitch used in the fastener industry. The pitch of threads 15 is preferably determined so that when the nut is initially engaged on the bolt it is free running for two or three threads due to axial clearance in the thread form. When the nut has been installed this two or three threads, the top flank of the thread on the bolt is pushed into contact with the top flank of the nut due to contact of the crest 31 on the bolt thread with the wedge ramp 37. On continuing application of torque, the crest 31 rides down the ramp and is bent or deformed and this tends to maintain a substantially even pressure between the top flanks of the threads to produce a prevailing torque during assembly that is believed to be rather constant and consistent. The pitch of the threads 15 is preferably determined so that with a given number of threads in engagement (as controlled, for example, by nut height) the bottom flank of the bolt threads contacts the bottom flank of the nut threads on complete assembly, as shown in FIG. 2, thus producing an ultimate position of flank contact at opposite ends and progressive crest deformation. This allows substantial clamp load to be developed in the threaded joint with little or no further deformation of the crests 31. This helps to limit or control the maximum plastic crest deformation and thereby tends to insure that prevailing torque will be present on repeated applications of the fastener. Contact of the bottom flanks acts as a means to limit or control bending of the crests of the bolt threads. When it occurs and more torque is applied, the fastener assembly reacts as one having standard mating V-threads but with the important advantage, derived from the wedge ramp effect, of resistance to relative transverse movement of the threads.

As indicated, the bolt threads are preferably standard and therefore have a predetermined pitch. The axial length of the ramp 37 can be preselected and the number of nut threads is known from the desired height of the nut. The pitch of the nut threads can then be determined from the formula $$P_n = P_b - (l/n)$$

where
$P_n$ = the pitch of the nut (internal) threads 15.
$P_b$ = the pitch of the bolt (external) threads 13.
$l$ = the axial length of ramp 37.
$n$ = the number of internal threads.

The more basic form of this formula, $l = n(P_b - P_n)$, may be used to establish other relationships among these four elements of the design as desired.

Modifications may be made in the specific details disclosed without departing from the spirit and scope of the invention. For example, the internal threads can be formed in a blind hole in a relatively large forging or casting for use with a stud bolt, in this case the forging or casting being the equivalent of the nut 17. The term "standard" as used herein is intended to refer to accepted thread specifications for form of thread, pitches, and tolerances as set forth in handbooks, etc., such as American Standard threads, and those set by industry, government, military, or corporate publications on thread standards.

What is claimed is:

1. A threaded assembly comprising a first part having external helical threads of substantially uniform pitch and substantially V-shape including top and bottom flanks intersecting in thread crests, and a second part having internal helical threads of modified substantially V-shape and substantially uniform pitch sized to receive the external threads, said internal threads having top and bottom flanks and being of the wedge ramp type and having wedge ramps located at the roots of the threads extending between adjacent top and bottom flanks, the pitch of said internal threads being slightly less than the pitch of the external threads.

2. An assembly as set forth in claim 1 wherein the pitch of said internal threads is substantially equal to the pitch of the external threads minus the dividend of the axial length of the ramp divided by the number of internal threads.

3. An assembly as set forth in claim 2 wherein under normal applied torque the top flank of the internal threads is capable of contact with a top flank of the external threads and the bottom flank of the internal threads is simultaneously capable of contact with a bottom flank of the external threads, the crests of the external threads being progressively increasingly deformed against the wedge ramps in the direction toward said bottom flank.

4. An assembly as set forth in claim 1 wherein the pitch of said external thread is standard and said pitches and axial length of the ramps are dimensionally related in conjunction with the number of internal threads to enable a top flank of the internal threads to be in contact simultaneously with contact between a bottom flank of the internal threads and a bottom flank of the external threads and in conjunction with said simultaneous contact said thread crests being progressively deformed against said wedge ramp in the direction of said bottom flanks, said external threads being of standard shape and said internal threads being of modified standard shape and the flanks of both threads being straight.

5. A part such as a nut having an internal aperture with a wall provided with internal helical threads of modified V-form and substantially uniform pitch and form and having top and bottom flanks and wedge ramps located at the roots of the threads extending between adjacent top and bottom flanks, the pitch of said internal threads being substantially equal to a standard pitch for external threads operative therewith minus the dividend of the axial length of the ramp divided by the number of internal threads.

6. A part as set forth in claim 5 wherein said flanks are straight and on substantially 30° angles, said wedge ramps being substantially normal to the top flanks.

* * * * *